US012748666B2

(12) United States Patent
Kawamoto

(10) Patent No.: US 12,748,666 B2
(45) Date of Patent: Sep. 29, 2026

(54) MANAGEMENT SYSTEM FOR CONTROL PROGRAM OF INDUSTRIAL CONTROLLER

(71) Applicant: KABUSHIKI KAISHA TOSHIBA, Tokyo (JP)

(72) Inventor: Junichi Kawamoto, Fuchu Tokyo (JP)

(73) Assignees: KABUSHIKI KAISHA TOSHIBA, Tokyo (JP); TOSHIBA INFRASTRUCTURE SYSTEMS & SOLUTIONS CORPORATION, Kawasaki (JP)

( * ) Notice: Subject to any disclaimer, the term of this patent is extended or adjusted under 35 U.S.C. 154(b) by 0 days.

(21) Appl. No.: 19/050,306

(22) Filed: Feb. 11, 2025

(65) Prior Publication Data

US 2025/0181459 A1 Jun. 5, 2025

Related U.S. Application Data

(63) Continuation of application No. PCT/JP2023/017787, filed on May 11, 2023.

(30) Foreign Application Priority Data

Sep. 21, 2022 (JP) ................................ 2022-150585

(51) Int. Cl.
*G06F 11/14* (2026.01)
*G05B 19/042* (2006.01)
*G06F 11/1446* (2026.01)

(52) U.S. Cl.
CPC ...... *G06F 11/1464* (2013.01); *G05B 19/0426* (2013.01); *G05B 2219/23027* (2013.01); *G06F 2201/80* (2013.01)

(58) Field of Classification Search
CPC ............ G06F 11/1464; G06F 2201/80; G06F 11/0736; G06F 11/0757; G06F 11/2028;
(Continued)

(56) References Cited

U.S. PATENT DOCUMENTS

2016/0112350 A1* 4/2016 Morrison ............... H04L 45/22 370/218
2017/0353382 A1* 12/2017 Gupta .................... H04L 12/18
(Continued)

FOREIGN PATENT DOCUMENTS

JP 2011048534 A 3/2011
JP 2012181606 A 9/2012
(Continued)

OTHER PUBLICATIONS

International Search Report issued on Jul. 25, 2023, in corresponding International Application No. PCT/JP2023/017787; 5 pages.

*Primary Examiner* — Cindy Nguyen
(74) *Attorney, Agent, or Firm* — Maier & Maier, PLLC

(57) ABSTRACT

A management system includes a first server and a second server. During ordinary operation, the first server apparatus is in a master state, and the second server apparatus is in a backup state. The second server apparatus belongs to a first group that receives data sent from the first server apparatus. The first server apparatus sends a first health signal to an address of the first group with a constant period. The second server apparatus switches from the backup state to the master state, based on the first health signal sent from the first server apparatus to the address of the first group.

7 Claims, 19 Drawing Sheets

(58) Field of Classification Search
CPC ................ G06F 11/20; G05B 19/0426; G05B 2219/23027; G05B 9/03; G05B 19/042
See application file for complete search history.

(56) References Cited

U.S. PATENT DOCUMENTS

| | | | | |
|---|---|---|---|---|
| 2021/0081287 | A1* | 3/2021 | Koning | H04L 69/40 |
| 2022/0114153 | A1* | 4/2022 | Kamp | G06F 16/278 |
| 2022/0121510 | A1* | 4/2022 | Huang | G06F 11/1451 |

FOREIGN PATENT DOCUMENTS

| | | | |
|---|---|---|---|
| JP | 2015032152 | A | 2/2015 |
| JP | 5840410 | B2 | 1/2016 |
| JP | 2020135157 | A | 8/2020 |
| JP | 2022025254 | A | 2/2022 |

* cited by examiner

MANAGEMENT SYSTEM FOR CONTROL PROGRAM OF INDUSTRIAL CONTROLLER

CROSS REFERENCE TO RELATED APPLICATIONS

This application is a Continuation of International Application No. PCT/JP2023/017787, filed on May 11, 2023 which claims the benefit of priority from the prior Japanese Patent Application No. 2022-150585, filed on Sep. 21, 2022, the entire contents of which are incorporated herein by reference.

FIELD

The embodiment relates to a management system for a control program of an industrial controller.

BACKGROUND

A control system for an industrial plant includes a management system that manages a control program of an industrial controller. The management system is constituted by a server apparatus and a plurality of client apparatuses. In a large-scale industrial plant, the number of client apparatuses is tens to hundreds.

In the management system as described above, there is a demand for the redundancy of the server apparatus. However, in a general redundancy technology, for example, when the number of server apparatuses is two, another server apparatus for controlling the two server apparatuses is necessary, so that a total of three server apparatuses are necessary.

DETAILED DESCRIPTION

Figure 1:
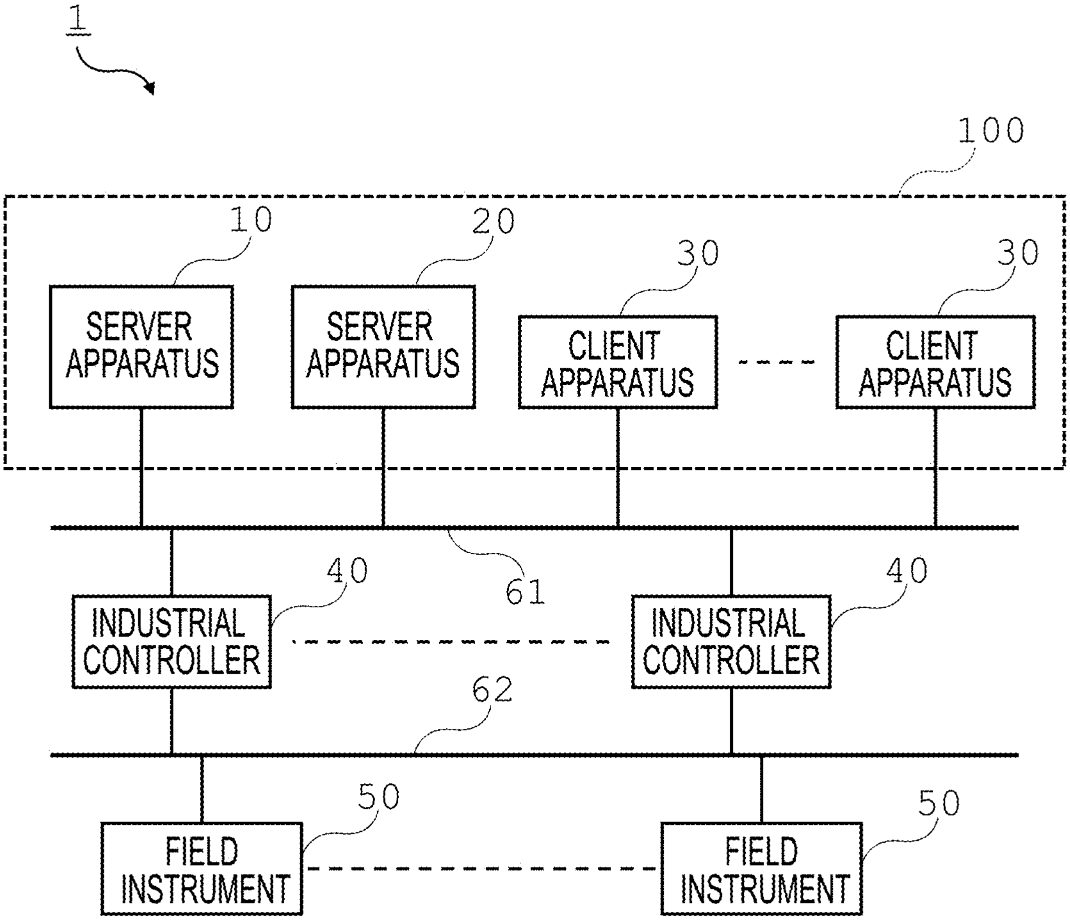
FIG. 1 is a diagram showing the configuration of a control system for an industrial plant according to an embodiment 1.

A management system for a control program of an industrial controller, the management system comprises a first server apparatus including a first processor and a first database in which the control program is registered; and a second server apparatus including a second processor and a second database in which the control program is registered. During ordinary operation, the first processor of the first server apparatus is in a master state, the second processor of the second server apparatus is in a backup state, and the second server apparatus belongs to a first group that receives data sent from the first server apparatus. The first processor of the first server apparatus sends a first health signal to an address of the first group with a constant period. The second processor of the second server apparatus switches from the backup state to the master state, based on the first health signal sent from the first server apparatus to the address of the first group.

The embodiment will be described below with reference to the drawings. The following descriptions will be made based on an example in which a control system according to the embodiment is used for the control of an industrial plant. However, a range in which the control system according to the embodiment can be applied is not limited to the control of the industrial plant. Further, in the drawings, identical or corresponding elements are denoted by identical reference characters, and detailed descriptions are omitted when appropriate.

Embodiment 1

FIG. 1 is a diagram showing the configuration of a control system 1 for an industrial plant according to an embodiment 1. The control system 1 includes a management system 100 that manages a control program of an industrial controller. The management system 100 includes a first server apparatus 10, a second server apparatus 20, and a single or plurality of client apparatuses 30. The management system 100 has a redundant configuration. During an ordinary operation, the first server apparatus 10 is in a master state, that is, in an operating state, and the second server apparatus 20 is in a backup state, that is, in a standby state. The first server apparatus 10, the second server apparatus 20, and the client apparatus 30 are connected to a control network 61.

To the control network 61, a single or plurality of industrial controllers 40 is connected. The industrial controller 40 is connected to a field network 62. To the field network 62, a single or plurality of field instruments 50 is connected. The specific method for realizing the control network 61 and the field network 62 is not particularly limited. As an example, the control network 61 and the field network 62 are realized by Ethernet®. Further, the control network 61 may be duplicated.

Figure 2:
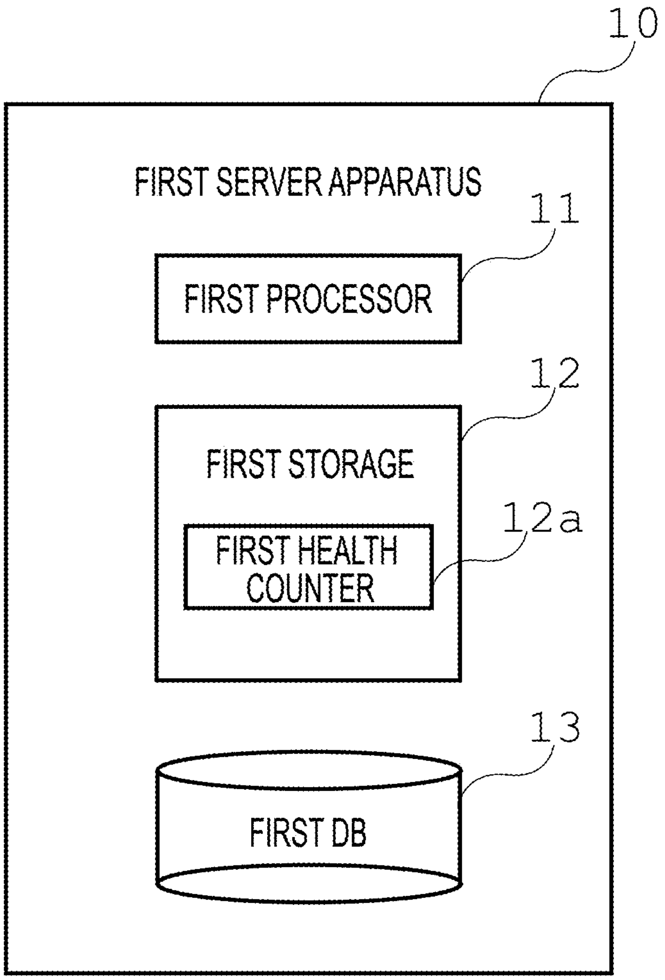
FIG. 2 is a diagram showing the configuration of a first server apparatus.

FIG. 2 is a diagram showing the configuration of the first server apparatus 10. The first server apparatus 10 includes a first processor 11, a first storage 12, and a first database 13. The first processor 11 controls the operation of the first server apparatus 10. In the first storage 12, a region for a first health counter 12*a* is secured. In the first database 13, a control program of the industrial controller 40 is registered.

The first server apparatus 10 manages a first group to which the second server apparatus 20 and the single or plurality of client apparatuses 30 can belong. By sending data to the address of the first group, the first server apparatus 10 can collectively send the same data to the second server apparatus 20 and the single or plurality of client apparatuses 30 that belong to the first group. Such a scheme can be realized by multicast communication based on UDP (User Datagram Protocol), for example.

While the first server apparatus 10 normally functions, the first health counter 12*a* is counted up or counted down with a predetermined period, for example, with a period of 1 second. Such a scheme can be realized by generating an interrupt with the predetermined period and incrementing or decrementing the value of a counter variable, for example.

The specific method for realizing the first server apparatus 10 is not particularly limited. As an example, the first server apparatus 10 is a personal computer. In this case, the first processor 11 is a CPU (Central Processing Unit), and the first storage 12 is constituted by a RAM (Random Access Memory) and a ROM (Read Only Memory). Further, the first database 13 is realized by an application program that is executed by a CPU and a table that is built in an auxiliary storage such as a HDD (Hard Disk Drive).

Figure 3:
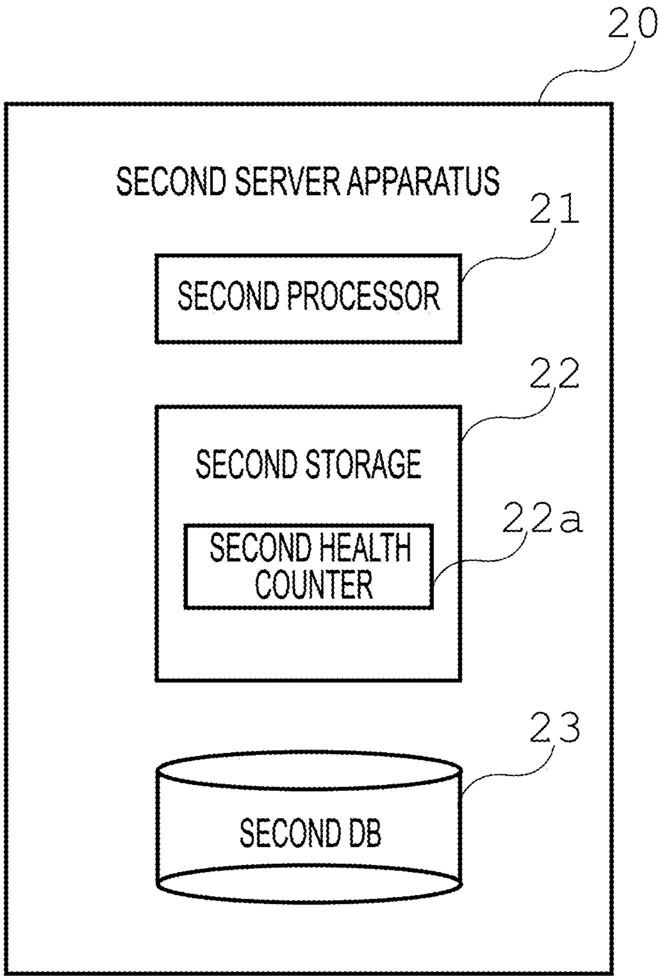
FIG. 3 is a diagram showing the configuration of a second server apparatus.

FIG. 3 is a diagram showing the configuration of the second server apparatus 20. The second server apparatus 20 includes a second processor 21, a second storage 22, and a second database 23. The second processor 21 controls the operation of the second server apparatus 20. In the second storage 22, a region for a second health counter 22*a* is secured. In the second database 23, the control program of the industrial controller 40 is registered.

The second server apparatus 20 can generate a second group to which the single or plurality of client apparatuses 30 can belong. By sending data to the address of the second group, the second server apparatus 20 can collectively send the same data to the single or plurality of client apparatuses 30 that belongs to the second group. Such a scheme can be realized by multicast communication based on UDP, for example.

The specific method for realizing the second server apparatus 20 is not particularly limited. As an example, the second server apparatus 20 is a personal computer. In this case, the second processor 21 is a CPU, and the second storage 22 is constituted by a RAM and a ROM. Further, the second database 23 is realized by an application program that is executed by a CPU and a table that is built in an auxiliary storage such as a HDD.

Figure 4:
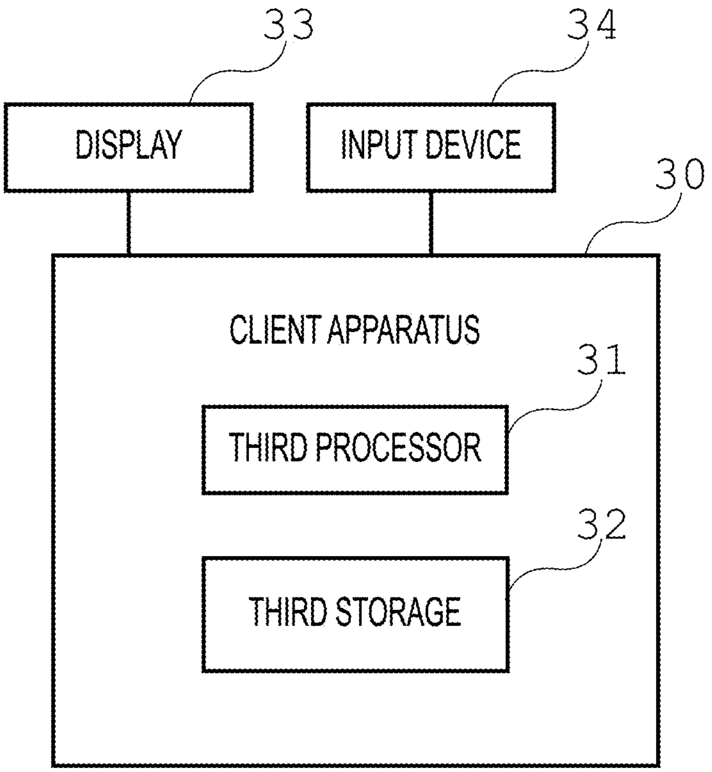
FIG. 4 is a diagram showing the configuration of a client apparatus.

FIG. 4 is a diagram showing the configuration of the client apparatus 30. The client apparatus 30 includes a third processor 31, a third storage 32, a display 33, and an input device 34. The client apparatus 30 can access a database of a server apparatus that manages a group to which the client apparatus 30 belongs. For example, in the case where the client apparatus 30 belongs to the first group that is managed by the first server apparatus 10, the client apparatus 30 can access the first database 13 of the first server apparatus 10. Further, in the case where the client apparatus 30 belongs to the second group that is managed by the second server apparatus 20, the client apparatus 30 can access the second database 23 of the second server apparatus 20.

Through the client apparatus 30, a user can utilize functions that are provided by the first server apparatus 10 or the second server apparatus 20. Specifically, by operating the client apparatus 30, the user can perform the creation, edit, addition, deletion, and others of a control program that is executed by the industrial controller 40. Further, by operating the client apparatus 30, the user can register the created control program in the first database 13 or the second database 23. Further, by operating the client apparatus 30, the user can send the control program registered in the first database 13 or the second database 23, to the industrial controller 40, and can cause the industrial controller 40 to execute the control program.

The specific method for realizing the client apparatus 30 is not particularly limited. As an example, the client apparatus 30 is a personal computer. In this case, the third processor 31 is a CPU, and the third storage 32 is constituted by a RAM and a ROM. Further, for example, the display 33 is a liquid crystal display, and for example, the input device 34 is constituted by a keyboard, a mouse, and the like.

Back to FIG. 1, the industrial controller 40 is a DCS (Distributed Control System), a PLC (Programmable Logic Controller), or the like. The industrial controller 40 collects states of the industrial plant, based on signals that are received from unillustrated sensors and others attached to a controlled object through the field instrument 50 and the field network 62.

The industrial controller 40 executes various computations based on the collected states of the plant, and controls the industrial plant by operating unillustrated actuators and others attached to the controlled object through the field network 62 and the field instrument 50, based on computation results.

The field instrument 50 is an instrument for performing the input and output of signals with various apparatuses attached to the controlled object. The field instrument 50 includes an AI (Analog Input) instrument, a DI (Digital Input) instrument, or the like to which signals from sensors and others attached to the controlled object are input. Further, the field instrument 50 includes an AO (Analog Output) instrument, a DO (Digital Output) instrument, or the like that outputs signals to actuators and others attached to the controlled object.

Next, the operation of the management system 100 according to the embodiment 1 will be described. The following description will be made assuming that there are two client apparatuses 30*a*, 30*b*. Further, when there is no need to distinguish between the two client apparatuses 30*a*, 30*b*, the two are collectively referred to as the client apparatus 30. Further, the control network 61 is duplicated by control networks 61*a*, 61*b*.

(Operation at Normal Time)

Figure 5:
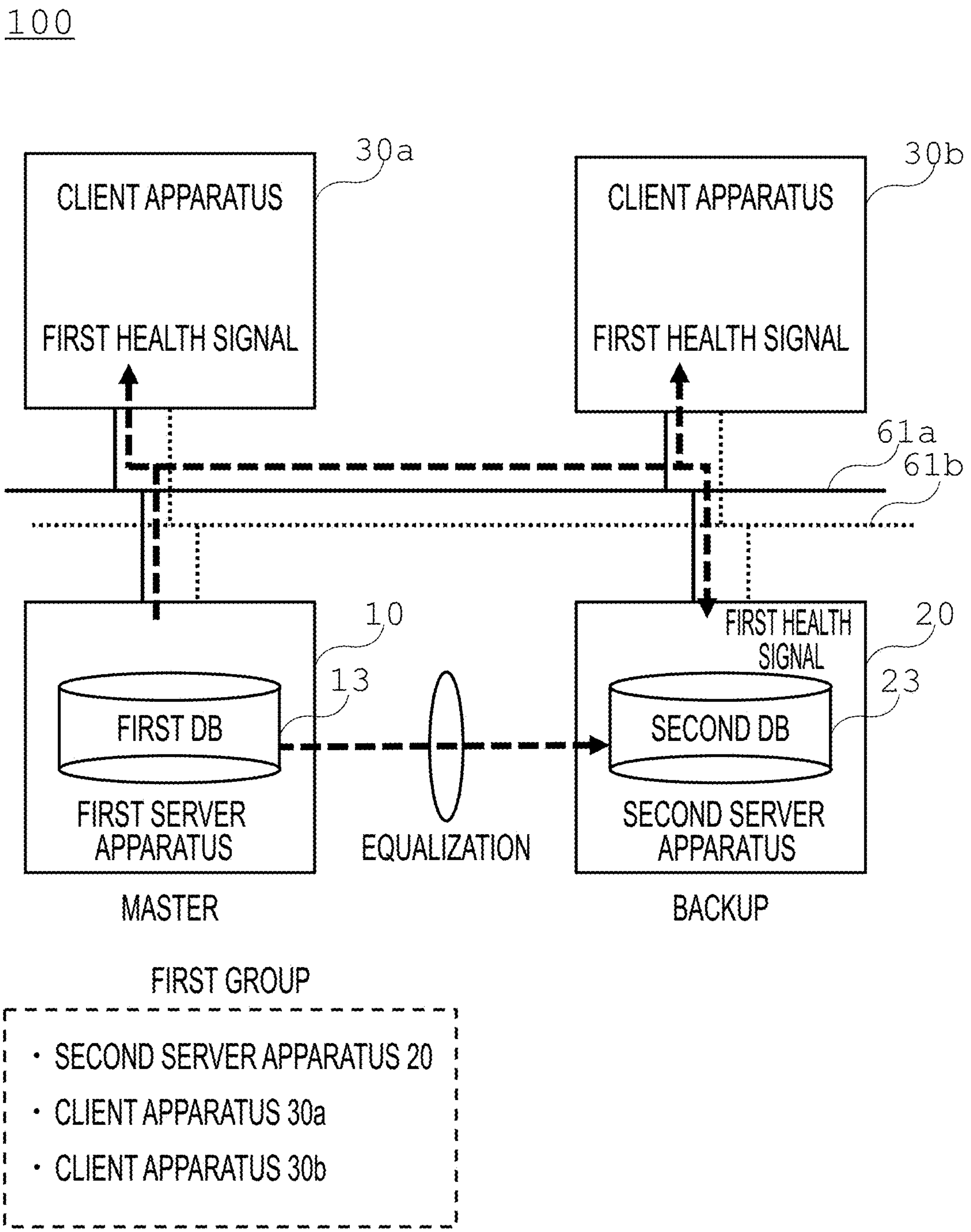
FIG. 5 is a diagram for describing the operation of a management system at the normal time.

FIG. 5 is a diagram for describing the operation of the management system 100 at the normal time. During the normal operation of the management system 100, the first server apparatus 10 is in the master state, and the second server apparatus 20 is in the backup state. The second server apparatus 20 belongs to the first group that is managed by the first server 10 in the master state, and can receive the data sent from the first server apparatus 10 to the address of the first group.

The first database 13 of the first server apparatus 10 and the second database 23 of the second server apparatus 20 are equalized with a predetermined period, for example, with a period of 30 seconds. The method for the equalization is not particularly limited. As an example, the first server apparatus 10 creates first history information when updating the first database 13, and the second server apparatus 20 performs the equalization from the first database 13 to the second database 23, based on the first history information.

The two client apparatuses 30*a*, 30*b* belong to the first group that is managed by the first server apparatus 10 in the master state, and can receive the data sent from the first server apparatus 10 to the address of the first group. Further, the client apparatus 30*a*, 30*b* can access the first database 13 of the first server apparatus 10.

The first server apparatus 10 sends the data including the count value (first health signal) of the first health counter 12*a* of the first server apparatus 10, to the address of the first group, with a constant period, for example, with a period of 3 seconds. Further, this data includes the machine name, IP address, and port number of the second server apparatus 20 in the backup state.

The second server apparatus 20 receives the data sent from the first server apparatus 10 to the address of the first group with the constat period, and determines whether the first server apparatus 10 is normally operating, based on the value of the first health signal included in the data. More specifically, in the case where the value of the first health signal received from the first server apparatus 10 changes for a predetermined period of time, for example, in 10 seconds, the second server apparatus 20 determines that the first server apparatus 10 is normally operating.

The client apparatuses 30*a*, 30*b* receive the data sent from the first server apparatus 10 to the group of the first group with the constant period, and determines whether the first server apparatus 10 is normally operating, based on the value of the first health signal included in the data. More specifically, in the case where the value of the first health signal received from the first server apparatus 10 changes for a predetermined period of time, for example, in 10 seconds, the client apparatuses 30*a*, 30*b* determines that the first server apparatus 10 is normally operating.

(Time of Abnormality Occurrent in First Server Apparatus)

FIG. 6A to FIG. 6D are diagrams for describing the operation of the first server apparatus 10 at the time of abnormality occurrence. Specifically, the abnormality of the first server apparatus 10 is the shutdown of the first server apparatus 10, the function stop of an application that is executed in the first server apparatus 10, the abnormality of the first database 13, the function stop of an operating system that is executed in the first server apparatus 10, or the like.

Figure 6A:
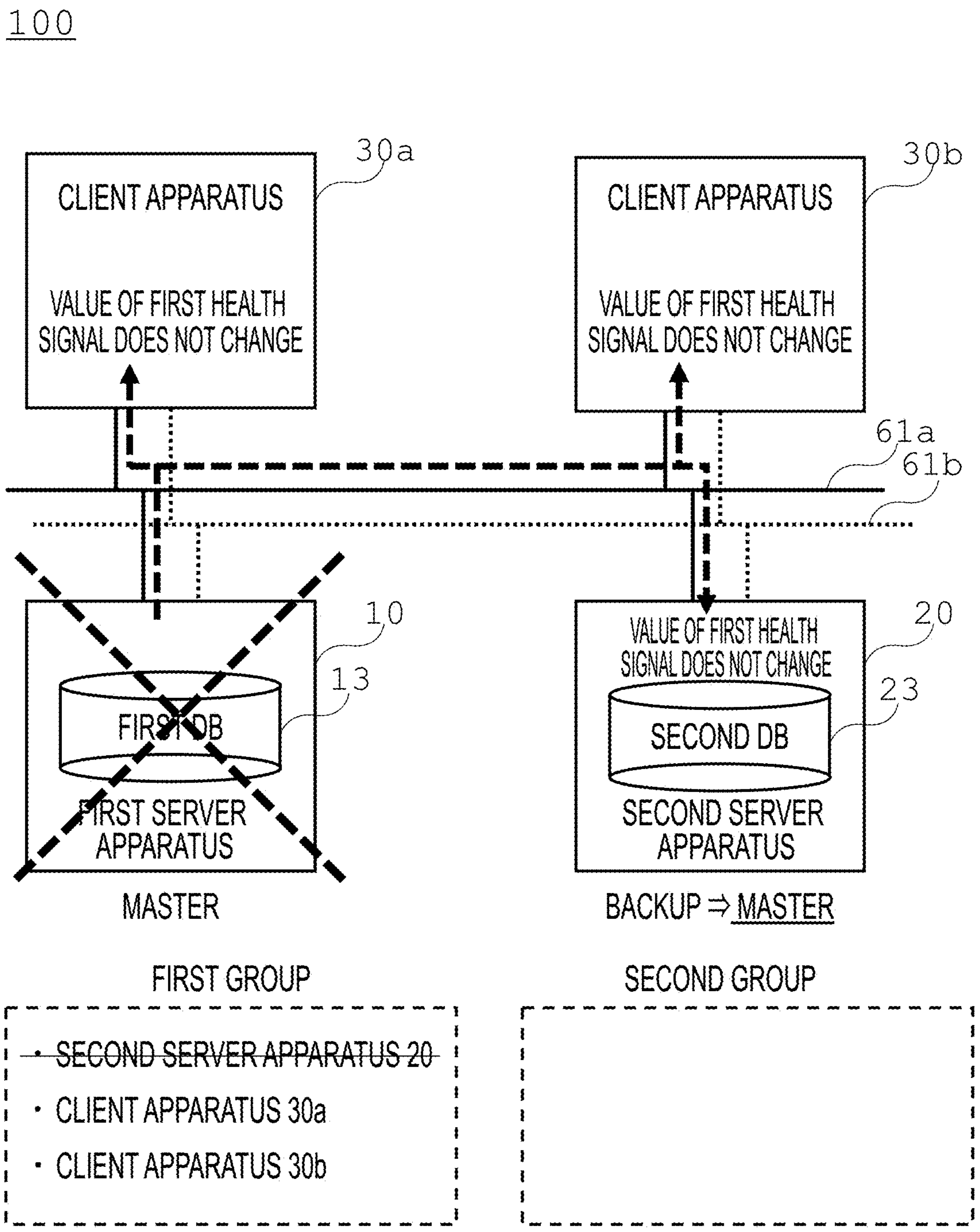
FIG. 6A is a diagram for describing the operation of the first server apparatus at the time of abnormality occurrence.

In FIG. 6A, when the abnormality occurs in the first server apparatus 10, the value of the first health signal included in the data sent from the first server apparatus 10 to the address of the first group with the constant period does not change. By detecting this, the second server apparatus 20 determines that the first server apparatus 10 is not normally operating, and switches from the backup state to the master state. After the switching to the master state, the second server apparatus 20 breaks away from the first group, and generates the second group.

Figure 6B:
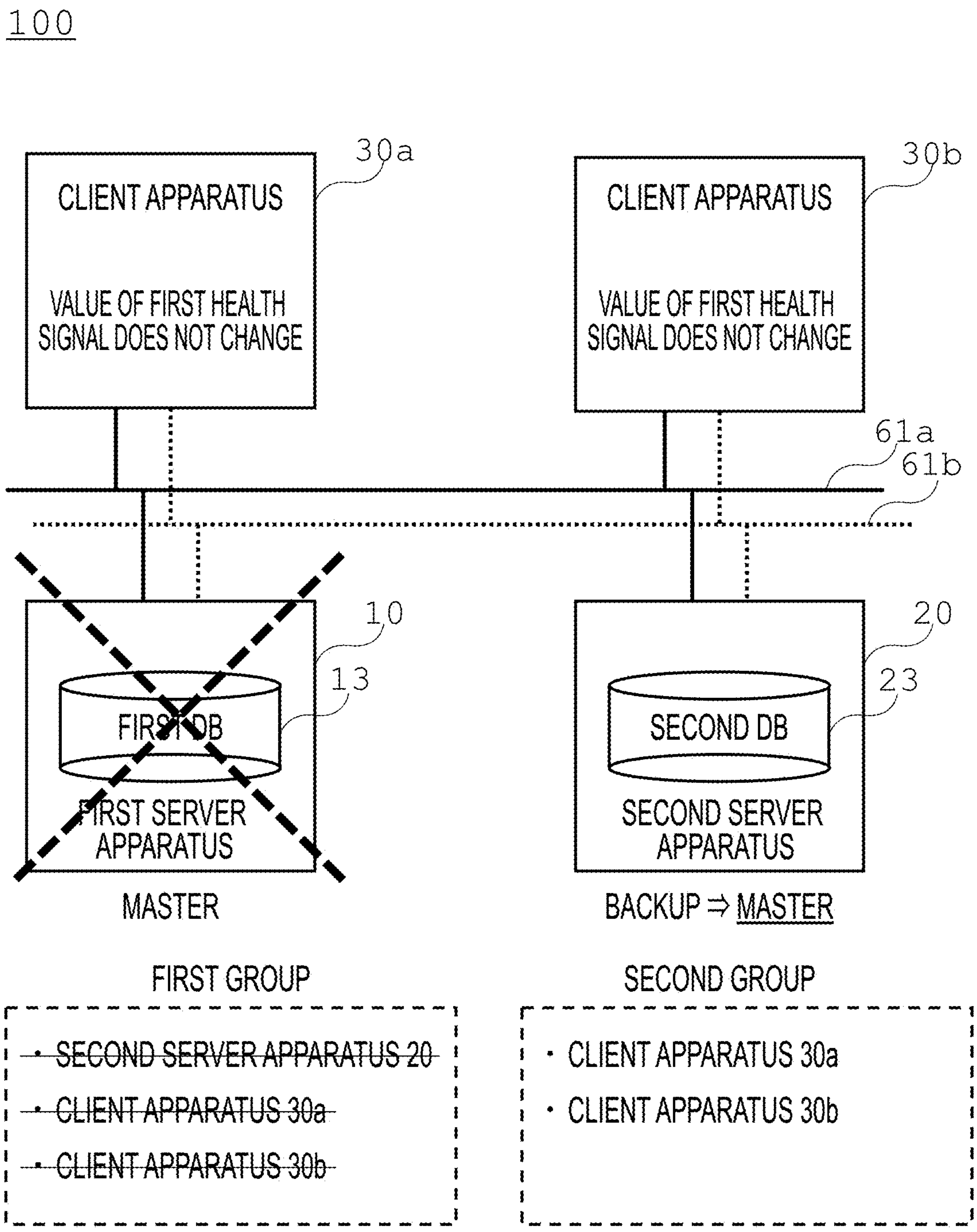
FIG. 6B is a diagram for describing the operation of the first server apparatus at the time of abnormality occurrence.

In FIG. 6B, the client apparatuses 30*a*, 30*b* detect that the value of the first health signal included in the data sent from the first server apparatus 10 to the address of the first group with the constant period does not change, and determine that the first server apparatus 10 is not normally operating. Then, the client apparatuses 30*a*, 30*b* break away from the first group that is managed by the first server apparatus 10, and belong to the second group that is generated by the second server apparatus 20. Thereby, the client apparatuses 30*a*, 30*b* can access the second database 23 of the second server apparatus 20.

Figure 6C:
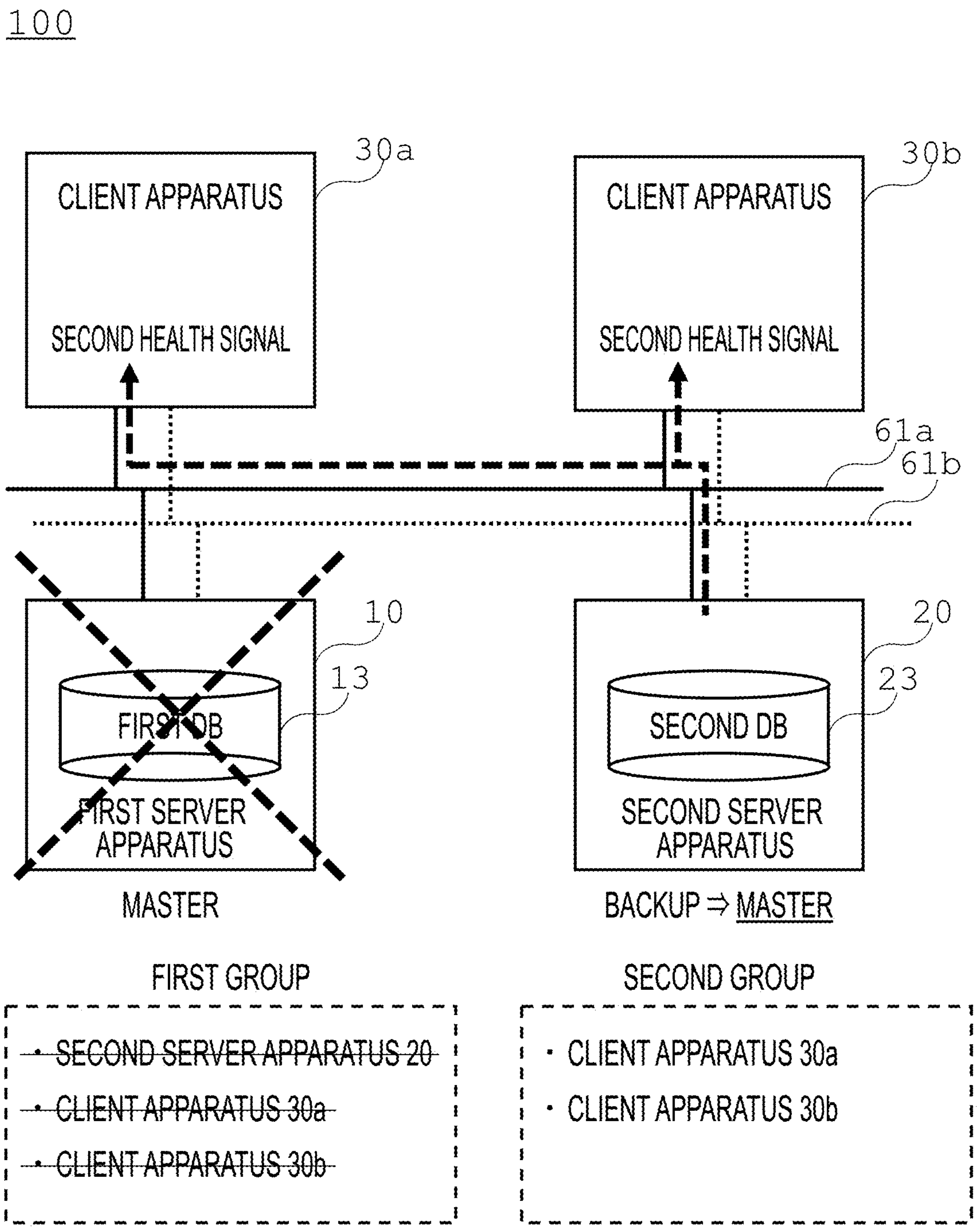
FIG. 6C is a diagram for describing the operation of the first server apparatus at the time of abnormality occurrence.

In FIG. 6C, the second server apparatus 20 sends the data including the count value (second health signal) of the second health counter 22*a* of the second server apparatus 20, to the address of the second group, with a constant period, for example, with a period of 3 seconds. At this time, the client apparatuses 30*a*, 30*b* can continue to access the second database 23 of the second server apparatus 20.

Figure 6D:
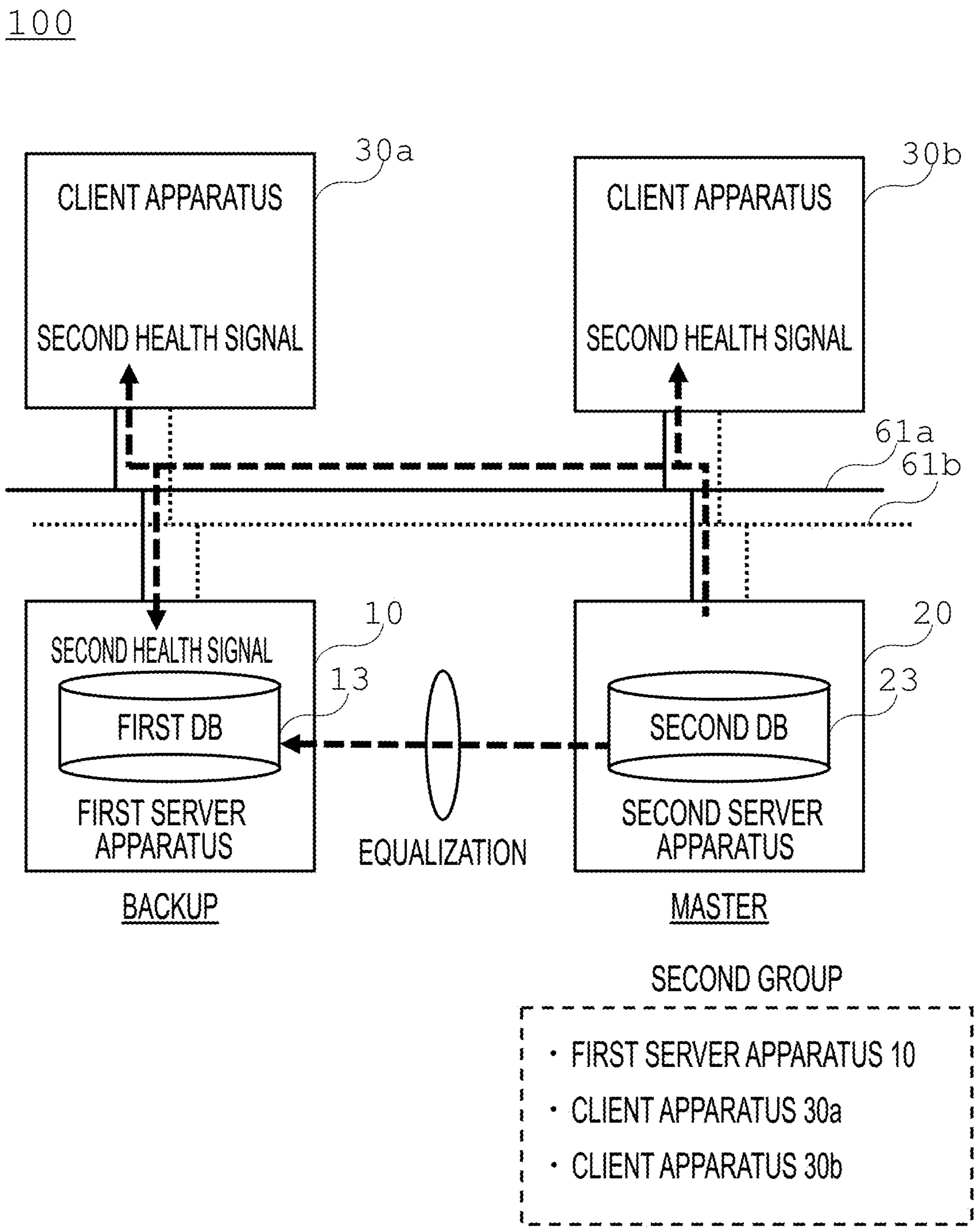
FIG. 6D is a diagram for describing the operation of the first server apparatus at the time of abnormality occurrence.

In FIG. 6D, when the first server apparatus 10 recovers, the first server apparatus 10 becomes the backup state, and belongs to the second group. On this occasion, the equalization from the second database 23 to the first database 13 is performed. The client apparatuses 30*a*, 30*b* can continue to access the second database 23 of the second server apparatus 20.

(Time of Communication Failure of First Server Apparatus)

FIG. 7A to FIG. 7D are diagrams for describing the operation of the first server apparatus 10 at the time of communication failure. Specifically, the communication failure of the first server apparatus 10 is the communication failure between the first server apparatus 10 and the duplicated control networks 61*a*, 61*b*.

Figure 7A:
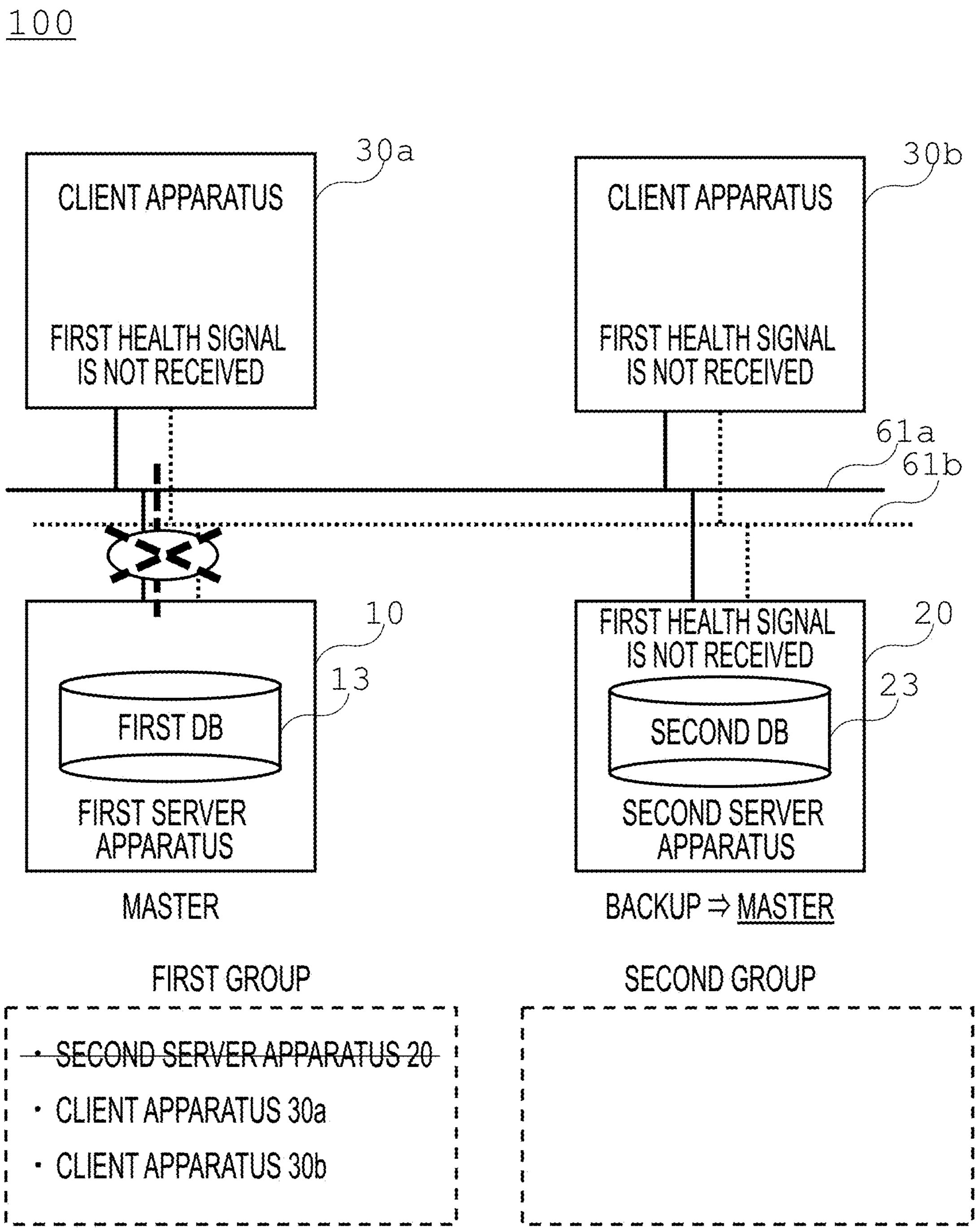
FIG. 7A is a diagram for describing the operation of the first server apparatus at the time of communication failure.

In FIG. 7A, when the communication failure between the first server apparatus 10 and the control networks 61*a*, 61*b* occurs, the data sent from the first server apparatus 10 to the address of the first group with the constant period and including the first health signal does not reach the second server apparatus 20. By detecting this, the second server apparatus 20 determines that the communication failure of the first server apparatus 10 has occurred, and switches from the backup state to the master state. After the switching to the master state, the second server apparatus 20 breaks away from the first group, and generates the second group.

Figure 7B:
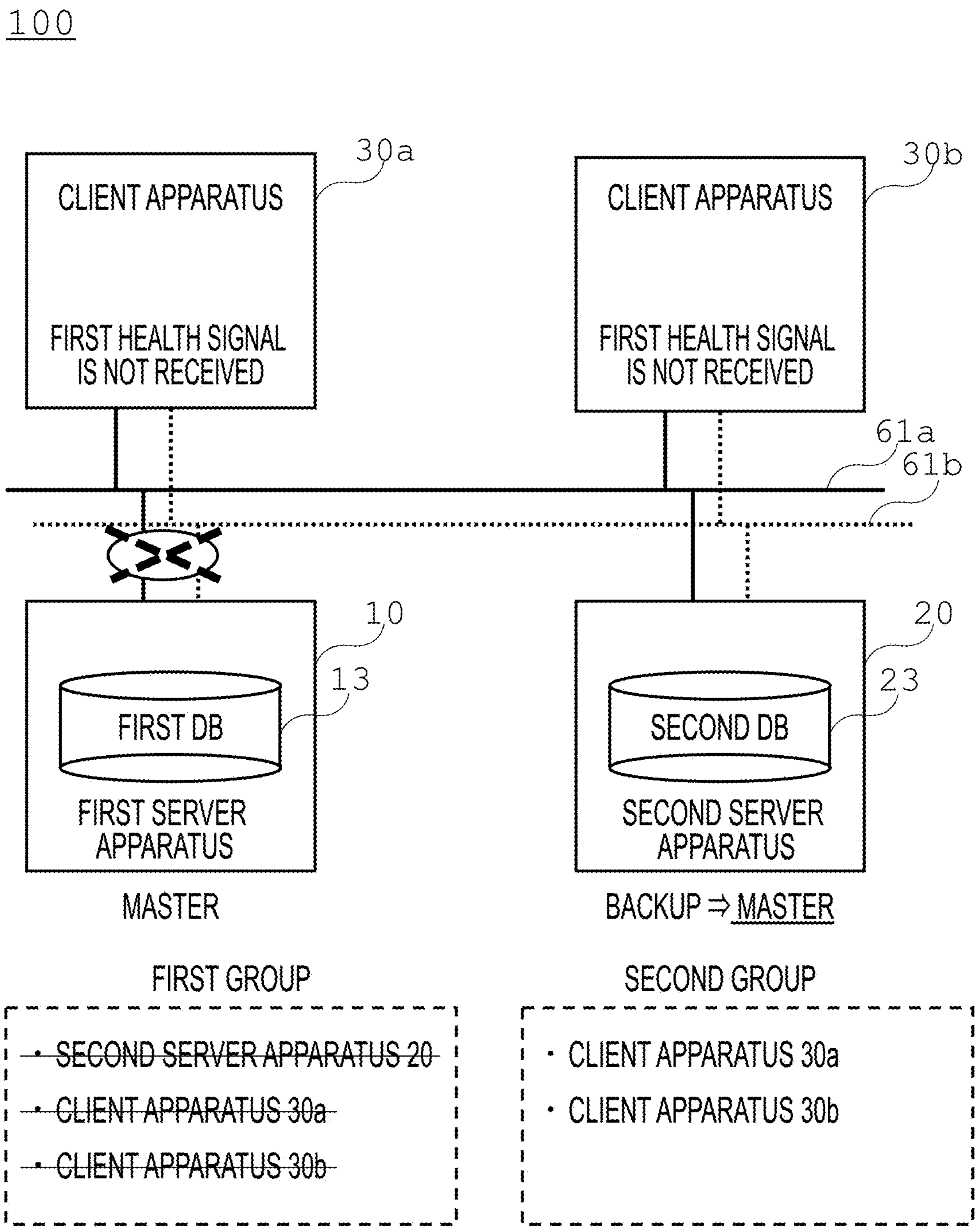
FIG. 7B is a diagram for describing the operation of the first server apparatus at the time of communication failure.

In FIG. 7B, when the data sent from the first server apparatus 10 to the address of the first group with the constant period and including the first health signal does not reach the client apparatuses 30*a*, 30*b*, the client apparatuses 30*a*, 30*b* determines that the communication failure of the first server apparatus 10 has occurred. Then, the client apparatuses 30*a*, 30*b* break away from the first group that is managed by the first server apparatus 10, and belong to the second group that is generated by the second server apparatus 20.

Figure 7C:
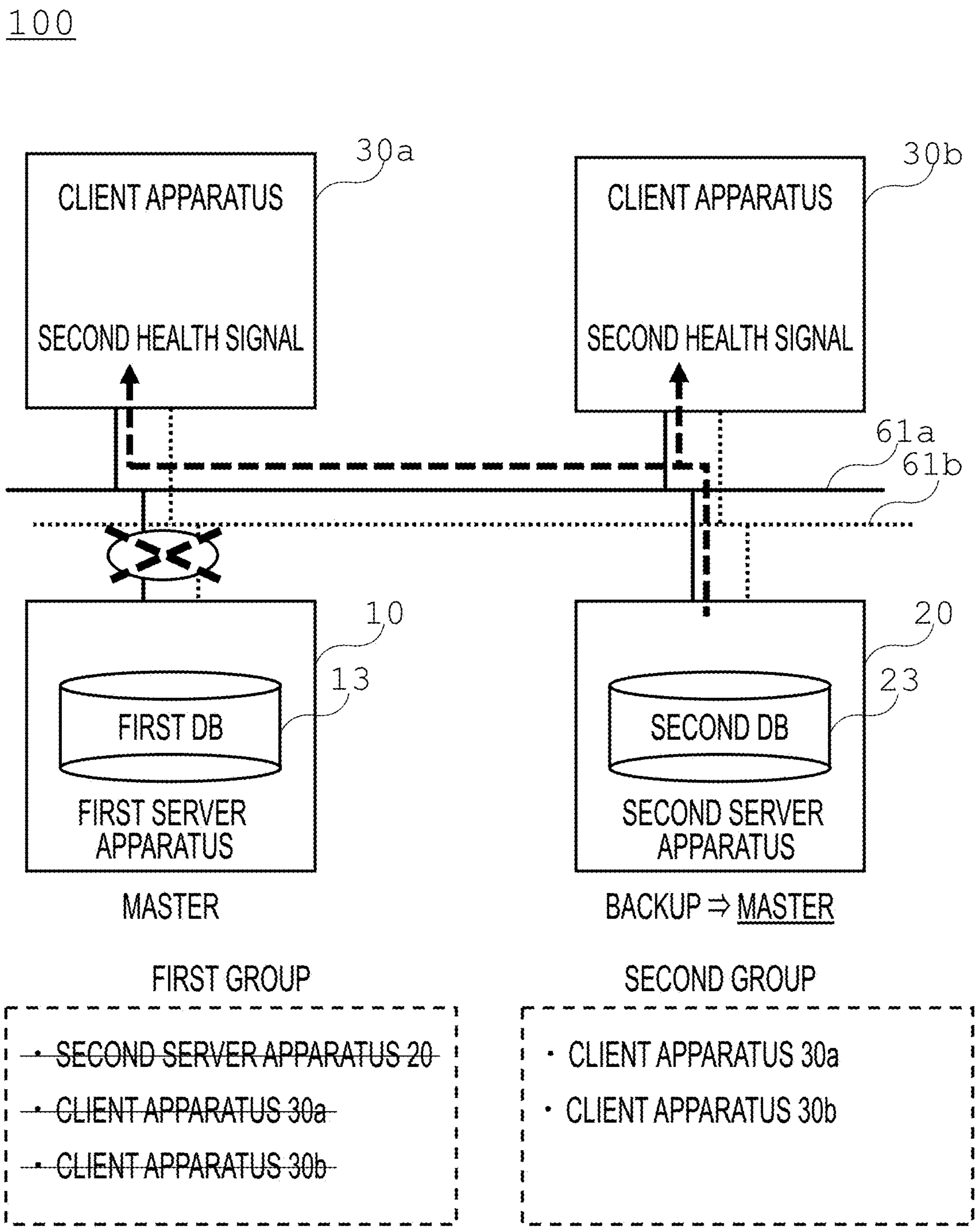
FIG. 7C is a diagram for describing the operation of the first server apparatus at the time of communication failure.

In FIG. 7C, the second server apparatus 20 sends the data including the count value (second health signal) of the second health counter 22*a* of the second server apparatus 20, to the address of the second group, with a constant period, for example, with a period of 3 seconds. The client apparatuses 30*a*, 30*b* confirm the receiving of the data sent from the second server apparatus 20 to the address of the second group and including the second health signal, and then can access the second database 23 of the second server apparatus 20.

Figure 7D:
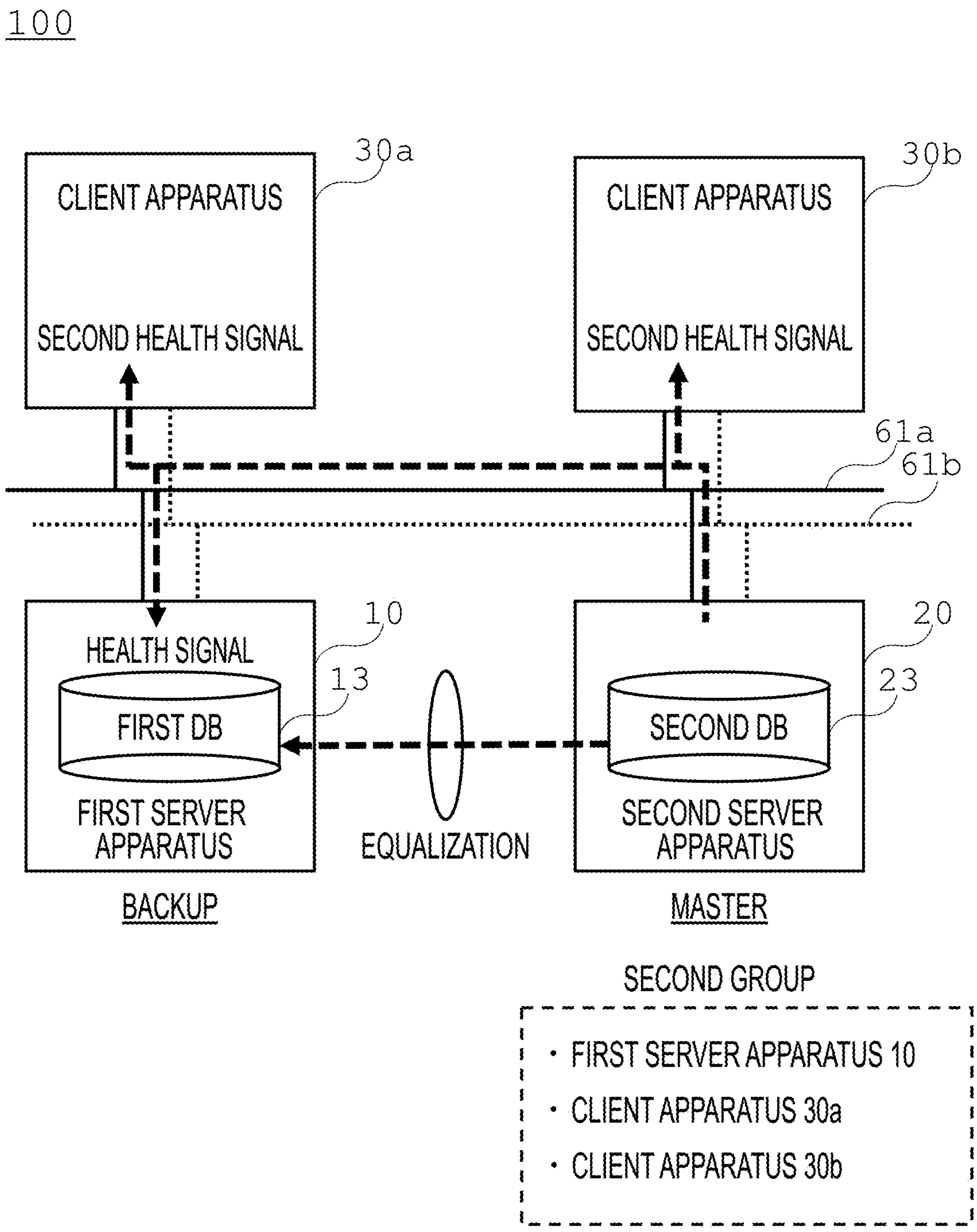
FIG. 7D is a diagram for describing the operation of the first server apparatus at the time of communication failure.

In FIG. 7D, after the recovery from the communication failure between the first server apparatus 10 and the control networks 61*a*, 61*b*, the first server apparatus 10 becomes the backup state, and belongs to the second group. On this occasion, the equalization from the second database 23 to the first database 13 is performed. The client apparatuses 30*a*, 30*b* can continue to access the second database 23 of the second server apparatus 20.

(Time of Communication Failure of Second Server Apparatus)

Figure 8A:
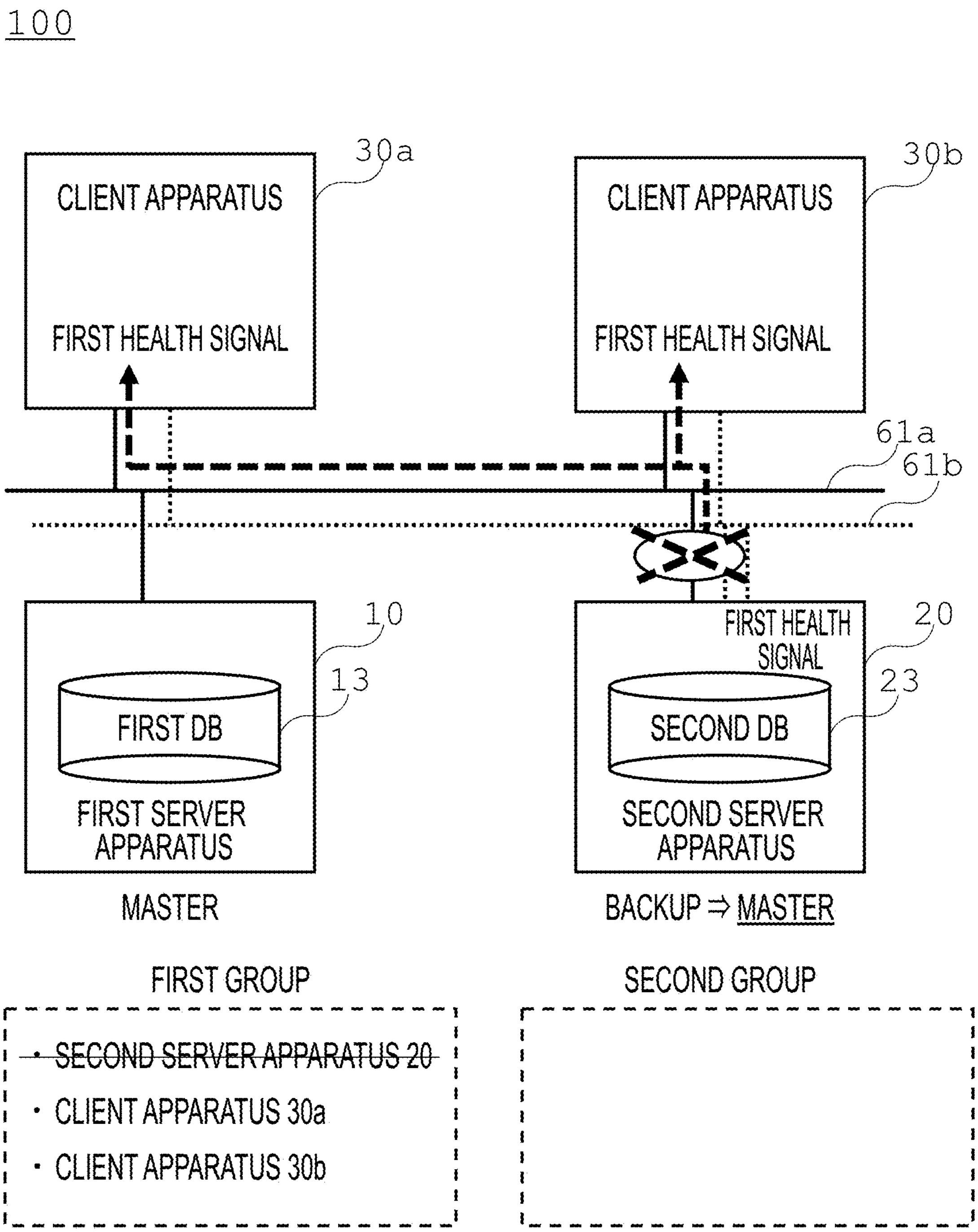
FIG. 8A is a diagram for describing the operation of the second server apparatus at the time of communication failure.
Figure 8B:
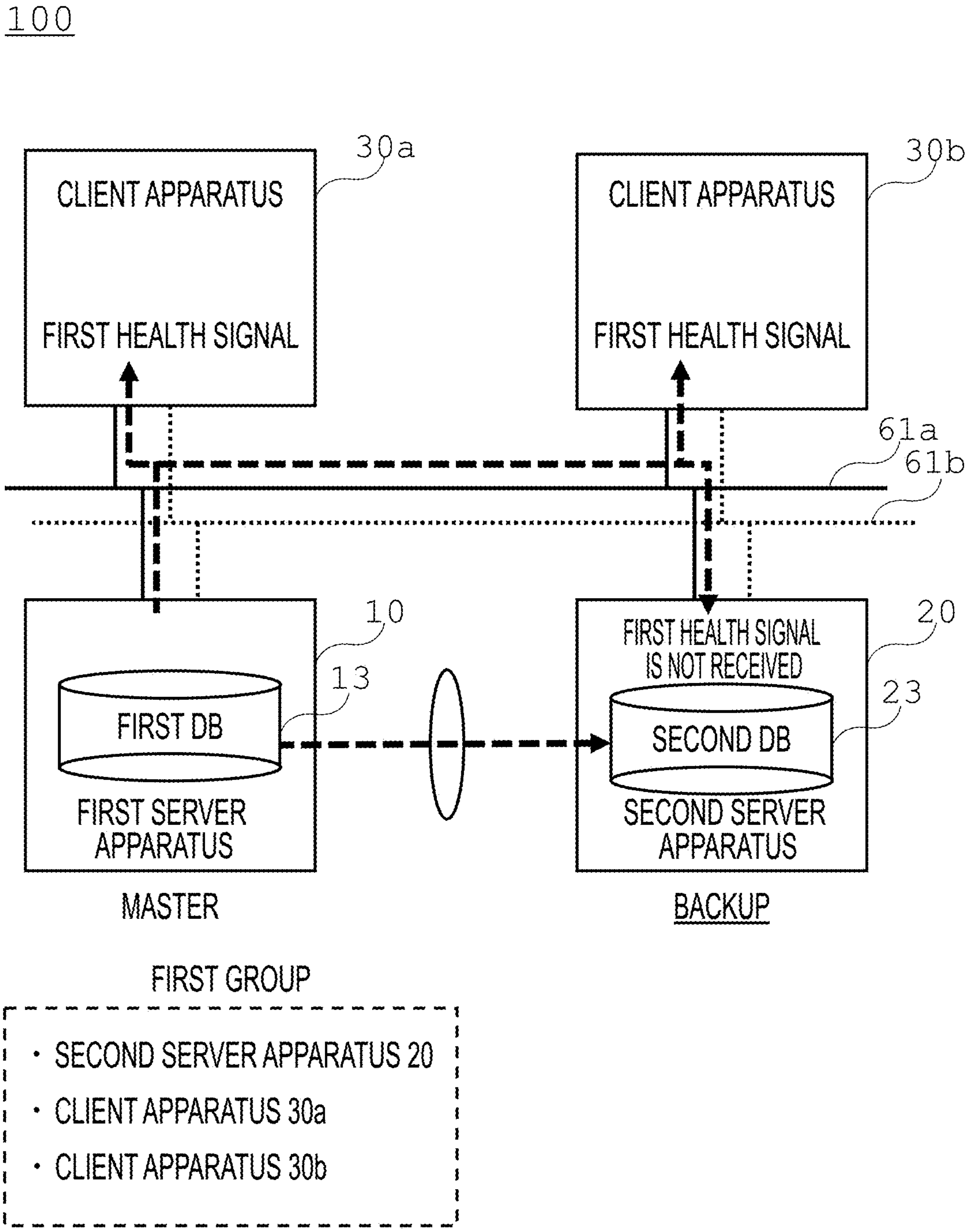
FIG. 8B is a diagram for describing the operation of the second server apparatus at the time of communication failure.

FIG. 8A and FIG. 8B are diagrams for describing the operation of the second server apparatus 20 at the time of communication failure. Specifically, the communication failure of the second server apparatus 20 is the communication failure between the second server apparatus 20 and the duplicated control networks 61*a*, 61*b*.

In FIG. 8A, when the communication failure between the second server apparatus 20 and the control networks 61*a*, 61*b* occurs, the data sent from the first server apparatus 10 to the address of the first group with the constant period and including the first health signal does not reach the second server apparatus 20. By detecting this, the second server apparatus 20 mistakenly determines that the communication failure of the first server apparatus 10 has occurred, and switches from the backup state to the master state. After the switching to the master state, the second server apparatus 20 breaks away from the first group, and generates the second group.

However, actually, the communication failure of the first server apparatus 10 has not occurred. Therefore, the client apparatuses 30*a*, 30*b* can receive the data sent from the first server apparatus 10 to the address of the first group with the constant period and including the first health signal. Accordingly, the client apparatuses 30*a*, 30*b* can continue to access the first database 13 of the first server apparatus 10.

In FIG. 8B, after the recovery from the communication failure between the second server apparatus 20 and the control networks 61*a*, 61*b*, the second server apparatus 20 becomes the backup state again, and belongs to the first group. On this occasion, the equalization from the first database 13 to the second database 23 is performed. The client apparatuses 30*a*, 30*b* can continue to access the first database 13 of the first server apparatus 10.

(Case where Two Server Apparatuses Both be in Master State)

FIG. 9A to FIG. 9D are diagrams for describing the operation when the first server apparatus 10 and the second server apparatus 20 both are in the master state. Such a state can occur in the case where the communication failure occurs between the first server apparatus 10 and the control network 61*b* and where the communication failure occurs between the second server apparatus 20 and the control network 61*a*.

Figure 9A:
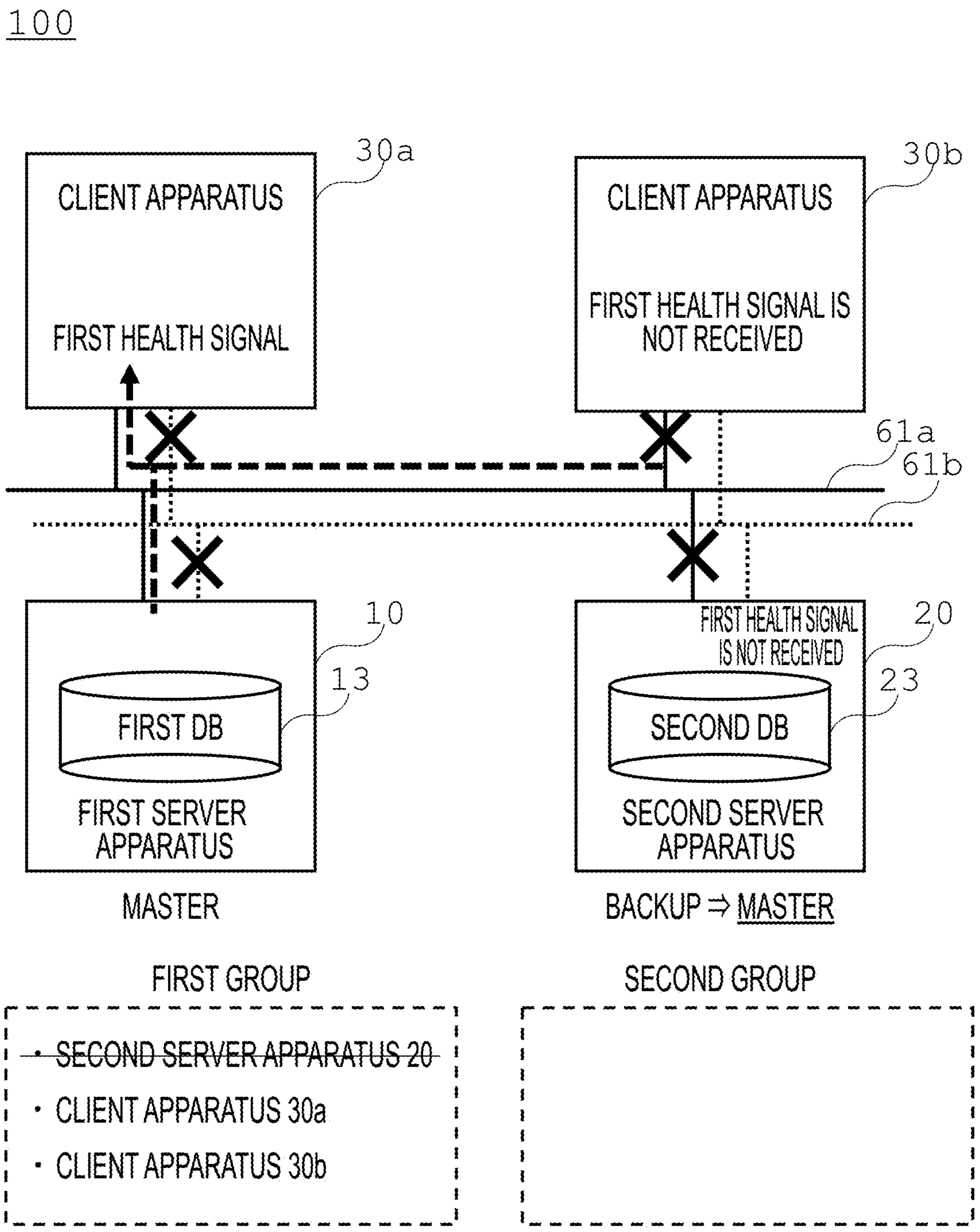
FIG. 9A is a diagram for describing the operation when the two server apparatuses both are in a master state.

In FIG. 9A, the data sent from the first server apparatus 10 to the address of the first group with the constant period and including the first health signal does not reach the second server apparatus 20. By detecting this, the second server apparatus 20 switches from the backup state to the master state. After the switching to the master state, the second server apparatus 20 breaks away from the first group, and generates the second group.

Figure 9B:
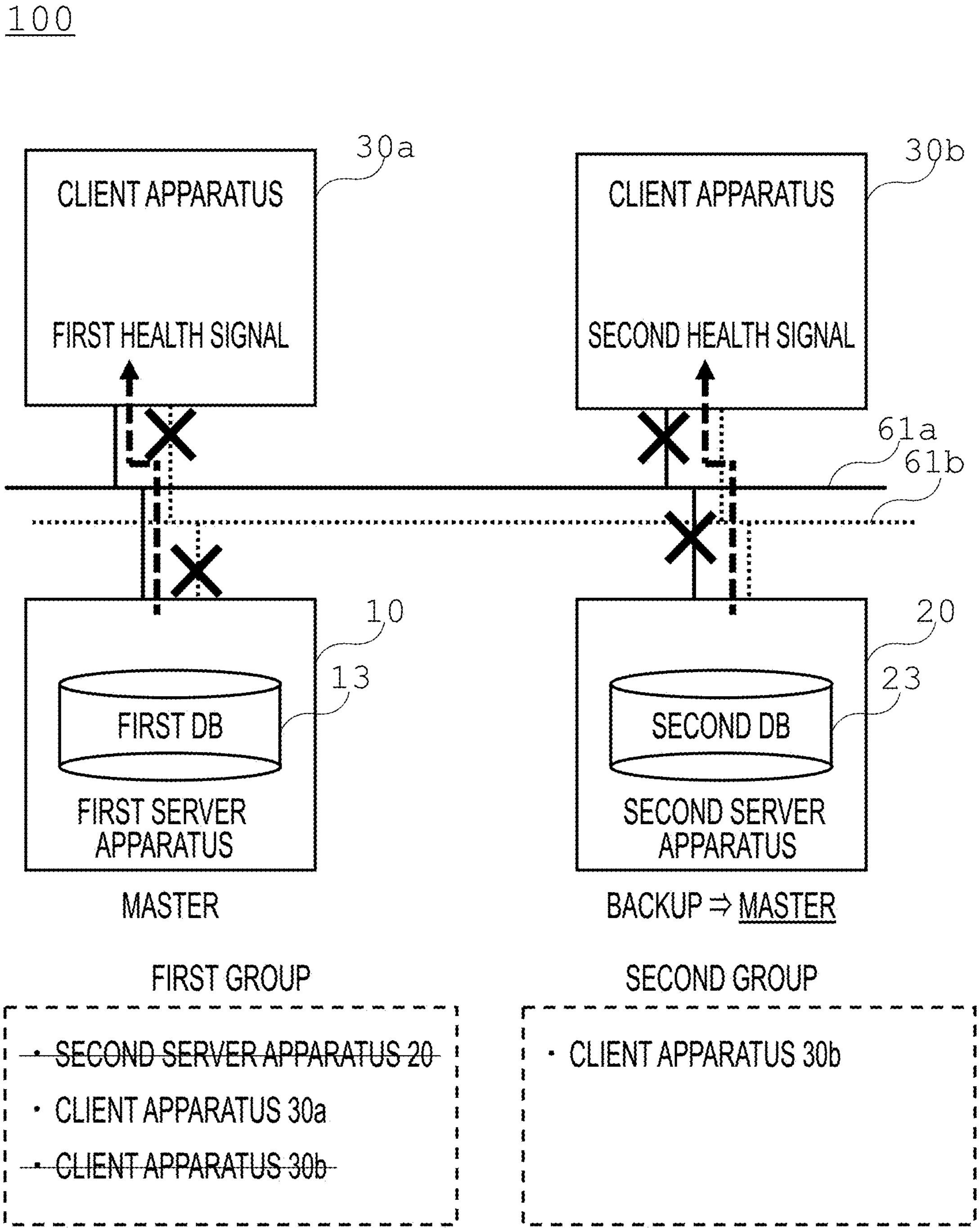
FIG. 9B is a diagram for describing the operation when the two server apparatuses both are in the master state.

In FIG. 9B, when the data sent from the first server apparatus 10 to the address of the first group with the constant period and including the first health signal does not reach the client apparatus 30*b*, the client apparatus 30*b* breaks away from the first group that is managed by the first server apparatus 10, and belongs to the second group that is generated by the second server apparatus 20. Thereby, the client apparatus 30*b* can access the second database 23 of the second server apparatus 20.

On the other hand, the client apparatus 30*a* can receive the data sent from the first server apparatus 10 to the address of the first group with the constant period and including the first health signal, and therefore, remains in the first group that is managed by the first server apparatus 10. Accordingly, the client apparatus 30*a* continues to access the first database 13 of the first server apparatus 10. The continuation of such a state generates the gap between the content of the first database 13 and the content of the second database 23.

Figure 9C:
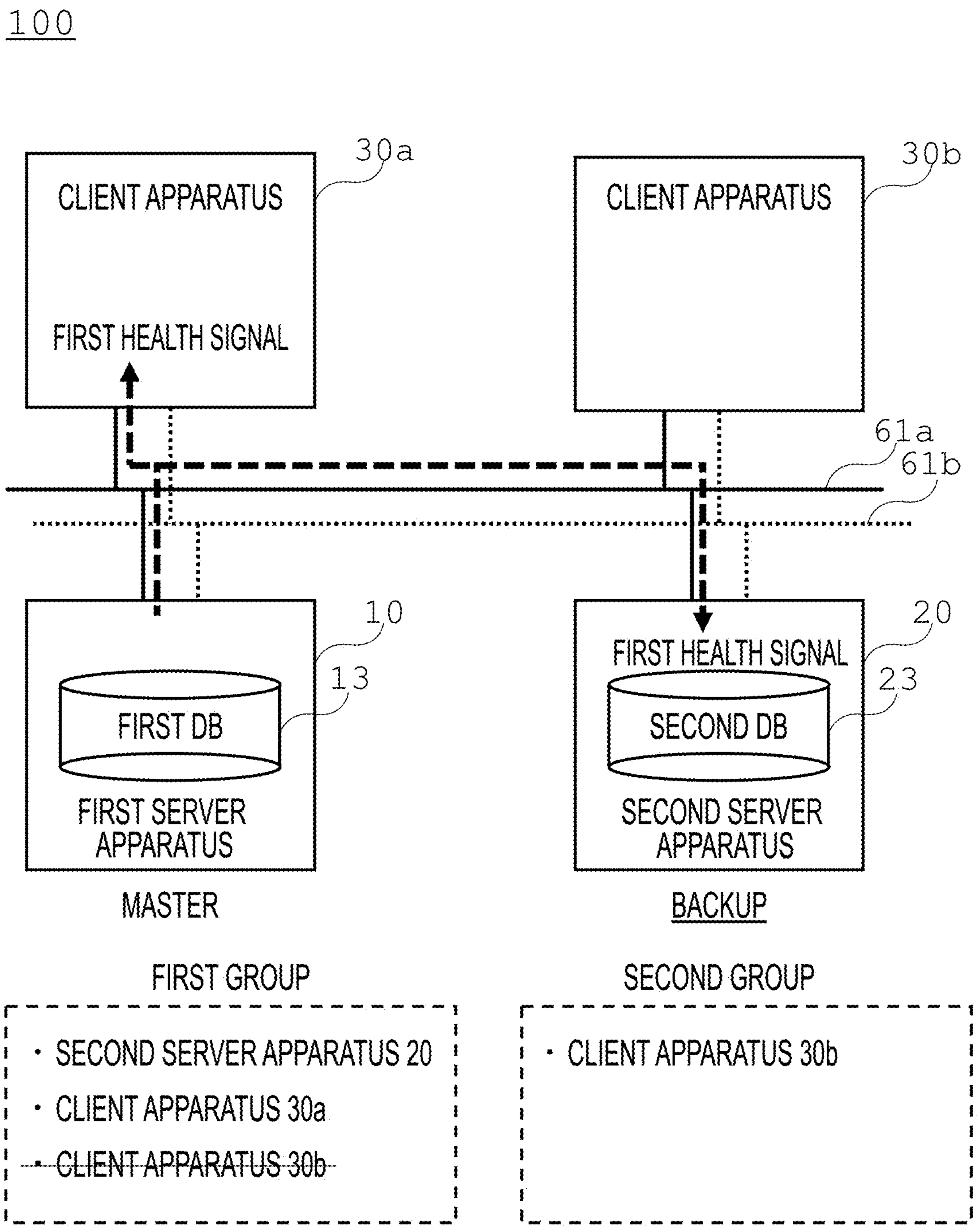
FIG. 9C is a diagram for describing the operation when the two server apparatuses both are in the master state.

In FIG. 9C, after the recovery from all communication failures of the control networks 61*a*, 61*b*, the first server apparatus 10 maintains the master state, and continues the sending of the data including the first health signal. On the other hand, when the second server apparatus 20 receives the data sent from the first server apparatus 10 and including the first health signal, the second server apparatus 20 switches from the master state to the backup state, belongs to the first group again, and stops the sending of the data including the second health signal.

Figure 9D:
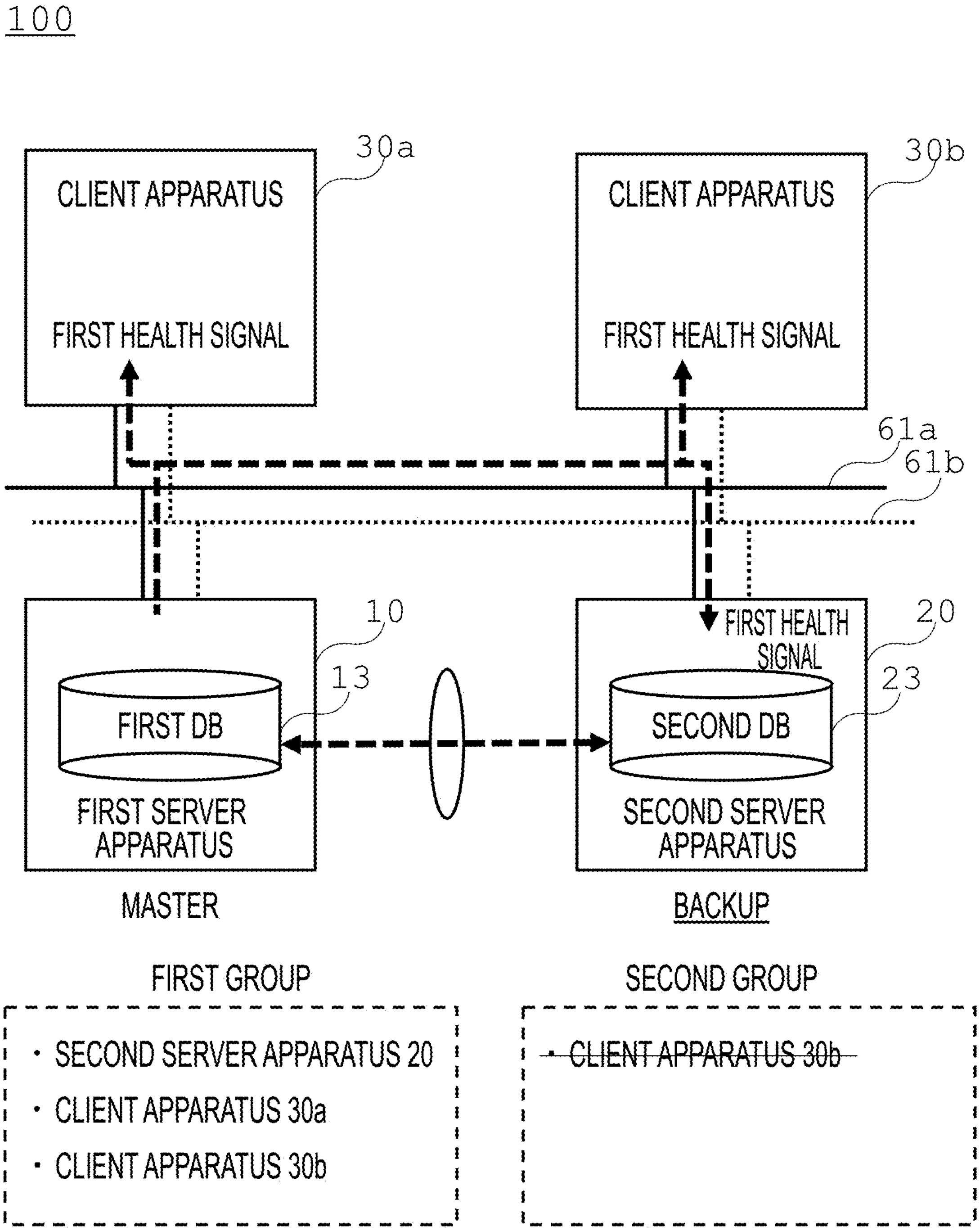
FIG. 9D is a diagram for describing the operation when the two server apparatuses both are in the master state.

In FIG. 9D, the client apparatus 30*a* remains in the first group, and continues to access the first database 13 of the first server apparatus 10. On the other hand, when the data sent from the second server apparatus 20 and including the second health signal does not reach the client apparatus 30*b*, the client apparatus 30*b* breaks away from the second group, and belongs to the first group again. Thereby, the client apparatus 30*b* can access the first database 13 of the first server apparatus 10 again. On this occasion, the equalization between the first database 13 and the second database 23 is performed.

As described above, in the management system 100 according to the embodiment 1, during the ordinary operation, the first server apparatus 10 is in the master state, and the second server apparatus 20 is in the backup state. Further, the second server apparatus 20 belongs to the first group that receives the data sent from the first server apparatus 10.

The first server apparatus 10 sends the first health signal to the address of the first group with the constant period, and the second server apparatus 20 switches from the backup state to the master state, based on the first health signal sent from the first server apparatus 10 to the address of the first group.

Because of the above characteristics, in the management system 100 according to the embodiment 1, the redundancy can be realized by two server apparatuses. Thereby, although three server apparatuses are conventionally necessary, only two server apparatuses are necessary, resulting in a significant cost reduction. Further, the switching of the second server apparatus 20 from the backup state to the master state is automatically performed, and therefore, user's trouble for the switching can be saved.

Further, during the ordinary operation, the client apparatus 30 belongs to the first group that is managed by the first server apparatus 10. Based on the first health signal sent from the first server apparatus 10 to the address of the first group, the client apparatus 30 breaks away from the first group, and belongs to the second group that is generated by the second server apparatus 20. Thereby, when the second server apparatus 20 switches to the master state, the client apparatus 30 is automatically connected to the second server apparatus 20. Accordingly, user's trouble for the switching can be saved.

Further, the client apparatus 30 accesses the first database 13 of the first server apparatus 10 when the client apparatus 30 belongs to the first group, and accesses the second database 23 of the second server apparatus 20 when the client apparatus 30 belongs to the second group. Thereby, the client apparatus 30 can always access the database of the server apparatus in the master state.

The first server apparatus 10 creates a first update history when updating the first database 13, and the second server apparatus 20 performs the equalization from the first database 13 to the second database 23, based on the first update history. The second server apparatus creates a second update history when updating the second database, and the first server apparatus 10 performs the equalization from the second database 23 to the first database 13, based on the second update history. Thereby, the contents of the first database 13 and the second database 23 can be always kept so as to be the same.

Some embodiments have been described. The embodiments have been presented as examples, and are not intended to limit scopes of the embodiments. The embodiments can be carried out in various other modes, and various exclusions, replacements, alterations, and combinations can be performed without departing from spirits of the embodiments. The embodiments and modifications of the embodiments are included in the scopes and spirits of the embodiments, and similarly, are included in the scope of the claims and their equivalents.

The embodiments of the present invention can also be configured as follows.

(Clauses)

[Clause 1] (a first server apparatus and a second server apparatus)

A management system for a control program of an industrial controller, the management system comprising:

a first server apparatus including a first processor and a first database in which the control program is registered; and a second server apparatus including a second processor and a second database in which the control program is registered, wherein:

during ordinary operation, the first processor of the first server apparatus is in a master state, the second processor of the second server apparatus is in a backup state, and the second server apparatus belongs to a first group that receives data sent from the first server apparatus;

the first processor of the first server apparatus sends a first health signal to an address of the first group with a constant period; and the second processor of the second server apparatus switches from the backup state to the master state, based on the first health signal sent from the first server apparatus to the address of the first group.

[Clause 2] (a first server apparatus and a second server apparatus)

The management system according to claim 1, wherein when the second processor of the second server apparatus switches to the master state, the second processor of the second server apparatus breaks away from the first group, and generates a second group that receives data sent from the second server apparatus.

[Clause 3] (a first server apparatus and a second server apparatus)

The management system according to claim 2, wherein the second processor of the second server apparatus sends a second health signal to an address of the second group with a constant period.

[Clause 4] (a first server apparatus and a second server apparatus)

The management system according to any one of claims 1 to 3, wherein:

the first health signal is a signal that is counted up or counted down with a predetermined period; and the second processor of the second server apparatus switches from the backup state to the master state, when a value of the first health signal sent from the first server apparatus to the address of the first group does not change for a predetermined period of time.

[Clause 5] (a first server apparatus and a second server apparatus)

The management system according to any one of claims 1 to 4, wherein the second processor of the second server apparatus switches from the backup state to the master state, when the first health signal sent from the first server apparatus to the address of the first group is not received.

[Clause 6] (a client apparatus) The management system according to claim 2, further comprising a single or plurality of client apparatuses including a third processor, wherein:

during the ordinary operation, the client apparatus belongs to the first group; and the third processor of the client apparatus breaks away from the first group and belongs to the second group, based on the first health signal sent from the first server apparatus to the address of the first group.

[Clause 7] (a client apparatus) The management system according to claim 6, wherein the third processor of the client apparatus accesses the first database of the first server apparatus when the third processor of the client apparatus belongs to the first group, and accesses the second database of the second server apparatus when the third processor of the client apparatus belongs to the second group.

[Clause 8] (equalization of database) The management system according to claim 1, wherein:

the first processor of the first server apparatus creates a first update history when updating the first database, and the second processor of the second server apparatus performs equalization from the first database to the second database, based on the first update history; and the second processor of the second server apparatus creates a second update history when updating the second database, and the first processor of the first server apparatus performs equalization from the second database to the first database, based on the second update history.

REFERENCE SIGNS LIST

1 control system
10 first server apparatus
11 first processor
12 first storage
12*a* first health counter
13 first database
20 second server apparatus
21 second processor
22 second storage
22*a* second health counter
23 second database
30 client apparatus
30*a* client apparatus
30*b* client apparatus
31 third processor
32 third storage
33 display
34 input device
40 industrial controller
50 field instrument
61 control network
61*a* control network
61*b* control network
62 field network
100 management system

The invention claimed is:

1. A management system for a control program of an industrial controller, the management system comprising:

a first server apparatus including a first processor and a first database in which the control program is registered; and a second server apparatus including a second processor and a second database in which the control program is registered; and a single or a plurality of client apparatuses including a third processor, wherein:

during ordinary operation, the first processor of the first server apparatus is in a master state, the second processor of the second server apparatus is in a backup state, and the second server apparatus belongs to a first group that receives data sent from the first server apparatus;

during the ordinary operation, the client apparatus belongs to the first group;

the first processor of the first server apparatus sends a first health signal to an address of the first group by multicast communication with a constant period; and the second processor of the second server apparatus switches from the backup state to the master state, based on the first health signal sent from the first server apparatus to the address of the first group;

when the second processor of the second server apparatus switches to the master state, the second processor of the second server apparatus breaks away from the first group, and generates a second group that receives data sent from the second server apparatus; and the third processor of the client apparatus breaks away from the first group and belongs to the second group, based on the first health signal sent from the first server apparatus to the address of the first group, wherein:

the first processor of the first server apparatus creates a first update history when updating the first database, and the second processor of the second server apparatus performs equalization from the first database to the second database, based on the first update history; and the second processor of the second server apparatus creates a second update history when updating the second database, and the first processor of the first server apparatus performs equalization from the second database to the first database, based on the second update history.

2. The management system according to claim 1, wherein when the second processor of the second server apparatus switches to the master state, the second processor of the second server apparatus breaks away from the first group, and generates a second group that receives data sent from the second server apparatus.

3. The management system according to claim 2, wherein the second processor of the second server apparatus sends a second health signal to an address of the second group with a constant period.

4. The management system according to claim 1, wherein:

the first health signal is a signal that is counted up or counted down with a predetermined period; and the second processor of the second server apparatus switches from the backup state to the master state, when a value of the first health signal sent from the first server apparatus to the address of the first group does not change for a predetermined period of time.

5. The management system according to claim 1, wherein the second processor of the second server apparatus switches from the backup state to the master state, when the first health signal sent from the first server apparatus to the address of the first group is not received.

6. The management system according to claim 2, further comprising a single or plurality of client apparatuses including a third processor, wherein:

during the ordinary operation, the client apparatus belongs to the first group; and the third processor of the client apparatus breaks away from the first group and belongs to the second group, based on the first health signal sent from the first server apparatus to the address of the first group.

7. The management system according to claim 6, wherein the third processor of the client apparatus accesses the first database of the first server apparatus when the third processor of the client apparatus belongs to the first group, and accesses the second database of the second server apparatus when the third processor of the client apparatus belongs to the second group.

* * * * *